United States Patent
Iriyama et al.

(10) Patent No.: US 7,202,000 B2
(45) Date of Patent: Apr. 10, 2007

(54) ANODE FOR SECONDARY BATTERY, SECONDARY BATTERY USING SAME AND METHOD FOR FABRICATING ANODE

(75) Inventors: Jiro Iriyama, Tokyo (JP); Hironori Yamamoto, Tokyo (JP); Tamaki Miura, Tokyo (JP); Koji Utsugi, Tokyo (JP); Masato Shirakata, Tokyo (JP); Mitsuhiro Mori, Tokyo (JP)

(73) Assignee: NEC Corporation, Minato-ku, Tokyo (JP)

( * ) Notice: Subject to any disclaimer, the term of this patent is extended or adjusted under 35 U.S.C. 154(b) by 348 days.

(21) Appl. No.: 10/485,474

(22) PCT Filed: Jul. 31, 2002

(86) PCT No.: PCT/JP02/07774

§ 371 (c)(1),
(2), (4) Date: Jan. 30, 2004

(87) PCT Pub. No.: WO03/012898

PCT Pub. Date: Feb. 13, 2003

(65) Prior Publication Data

US 2004/0175621 A1   Sep. 9, 2004

(30) Foreign Application Priority Data

Jul. 31, 2001 (JP) .............................. 2001-232905
Jul. 22, 2002 (JP) .............................. 2002-212547

(51) Int. Cl.
*H01M 4/58* (2006.01)
*B05D 5/12* (2006.01)
*C23C 14/34* (2006.01)

(52) U.S. Cl. .............................. 429/231.95; 252/182.1; 427/123; 204/192.15

(58) Field of Classification Search ........... 429/231.95; 252/182.1; 427/123; 204/192.15
See application file for complete search history.

(56) References Cited

U.S. PATENT DOCUMENTS

| 5,824,434 | A | * | 10/1998 | Kawakami et al. | ......... 429/209 |
| 6,800,397 | B2 | * | 10/2004 | Okada | .................. 429/231.95 |
| 2002/0114993 | A1 | * | 8/2002 | Miyaki et al. | .............. 429/137 |
| 2002/0168568 | A1 | * | 11/2002 | Yamaki et al. | .............. 429/209 |

FOREIGN PATENT DOCUMENTS

| JP | 3-241675 A | 10/1991 |
| JP | 4-73862 A | 3/1992 |
| JP | 5-275076 A | 10/1993 |
| JP | 6-310125 A | 11/1994 |
| JP | 7-50162 A | 2/1995 |

(Continued)

*Primary Examiner*—Dah-Wei Yuan
*Assistant Examiner*—Karie O'Neill
(74) *Attorney, Agent, or Firm*—Muirhead & Saturnelli, LLC (57) ABSTRACT

An anode for a secondary battery capable of inserting and extracting a lithium ion having a multi-layered structure including a first anode layer containing carbon as a main component; a second anode layer made of a film-like material through which a lithium component passes; and a third anode layer containing lithium and/or a lithium-containing compound as a main component. The battery capacity of the lithium ion battery is substantially increased while the higher charge-discharge efficiency and the stable cycle performance are maintained.

16 Claims, 3 Drawing Sheets

FOREIGN PATENT DOCUMENTS

| | | |
|---|---|---|
| JP | 7-326342 A | 12/1995 |
| JP | 7-326345 A | 12/1995 |
| JP | 8-124597 A | 5/1996 |
| JP | 8-153514 A | 6/1996 |
| JP | 9-129217 A | 5/1997 |
| JP | 10-144295 A | 5/1998 |
| JP | 2002-15726 A | 1/2002 |
| JP | 2002-15729 A | 1/2002 |
| JP | 2002-237295 | 8/2002 |

* cited by examiner

ANODE FOR SECONDARY BATTERY, SECONDARY BATTERY USING SAME AND METHOD FOR FABRICATING ANODE

TECHNICAL FIELD

The present invention relates to an anode for a secondary battery, a secondary battery having the anode as its component, and a method for fabricating the anode.

BACKGROUND ART

Because of the prevalence of mobile terminals such as a cellular phone and a notebook computer, the role of a secondary battery used for their power sources has been increasing. The secondary battery is required to have the functions such as compactness, lightness, higher capacity and resistance to deterioration after the repetition of charging and discharging.

Metal lithium may be used as the anode of the secondary battery because of its higher energy density and lightness. However, in this case, with the progress of the cycles of the charging and the discharging, needle crystals (dendrite) deposited on the lithium surface during the charging penetrate a separator to cause the internal short-circuit failure, thereby reducing the battery life.

Lithium alloy having a composition formula of $Li_aA$ (A is a metal such as Al, and "a" satisfies $0<a\leq5$) has been investigated to be used as the anode. While the anode has a higher amount of inserting and extracting lithium ions per unit volume or a higher capacity, pulverization proceeds with the progress of the charging and discharging cycles due to expansion and contraction of the anode during the absorption and the desorption of the lithium ions. The pulverization causes a problem of the shorter charge-discharge cycle life.

If a carbon material such as graphite and hard carbon which is capable of inserting and extracting the lithium ion is used as the anode, a problem arises, though the charge-discharge cycles can be excellently repeated, that the energy density is lower because the capacity of the graphite material is lower than the metal lithium or the lithium alloy and the irreversible capacity of the hard carbon at the initial charging and discharging is large to make the charge-discharge efficiency lower.

Accordingly, a large number of investigations have been conducted to increase the capacity and the charge-discharge efficiency of the carbon anode.

JP-A-9(1997)-259868 discloses that aluminum, lead or silver having a smaller particle size acting as an auxiliary agent for charging and discharging the lithium ions is added to the carbon material to realize the higher capacity.

The PCT publication WO96/33519 discloses the use of amorphous metal oxide containing tin as the anode material. The amorphous metal oxide-anode is reported to repeat the charge-discharge cycles more excellently than the metal lithium or the lithium alloy.

JP-A-7(1995)-326342 discloses an anode for lithium secondary battery having a layered structure acting as an active material and prepared by using a carbon layer and a porous layer made of lithium alloy and formed on the carbon layer. The anode is reported to provide the lithium secondary battery having the larger discharging capacity together with the higher electromotive force.

For the purpose of preventing the deterioration of the anode, JP-A-5(1993)-234583 proposes the use of a carbon material coated with aluminum as the anode material, thereby preventing the intercalation of a lithium ion between carbon layers in the solvated state. As a result, the rapid deterioration of the cycle performance as well as the deterioration of the carbon layers can be suppressed.

On the other hand, JP-A-5(1993)-234583 discloses that a metal lithium foil affixed to the outermost section of an anode plate is allowed to diffuse into carbon for improving the charge-discharge efficiency. In accordance with this method, a secondary battery with a non-aqueous electrolyte which has higher energy density and is excellent in its anti-over-discharge performance can be obtained.

JP-A-5(1993)-234621 discloses a carbon material to which lithium powder acting as an anode active material is adhered in advance. A safety battery having the higher capacity can be provided by using the above anode because the difference between the capacities of the charge and the discharge can be eliminated.

JP-A-5(1993)-234621 also discloses a multi-layered electrode for a secondary battery in which an alkaline metal acting as an active material is supported on a carrier having carbon as a main component. Thereby, the anode for the secondary battery can be obtained which has a larger electrode capacity and is excellent in its charge-discharge cycle performance.

JP-A-5(1993)-242911 discloses the electric connection between a component, other than an anode active material, electrically connected to an anode and metal lithium in advance at the time of assembling the battery, thereby increasing the energy density and improving the over-discharge performance.

JP-A-10(1998)-144295 discloses an anode which is prepared by vapor-depositing an electro-conductive metal which is not alloyed with lithium on a carbon material surface followed by the evaporation of the lithium on the electro-conductive metal. In the anode, the lithium is efficiently inserted in the anode active material to securely compensate the capacity loss of the anode. Thereby, in addition to the increase of the initial charge-discharge efficiency, the battery capacity can be increased and the charge-discharge cycle performance can be improved.

JP-A-5(1993)-275077 discloses an anode for lithium secondary battery which is prepared by coating a carbon material acting as an anode component with a lithium-ion conductive solid electrolyte film. The improved lithium secondary battery can be provided which uses the carbon material as the anode and propylene carbonate as at least part of an organic solvent acting as electrolyte.

JP-A-2000-182602 discloses an anode for a secondary battery which is prepared by affixing a metal foil containing lithium as a main component on an anode sheet made of amorphous oxide which enables to insert and extract lithium.

However, the technique in which small-sized aluminum is added to a carbon material disclosed in JP-A-9(1997)-259868 arises problems such that the charge-discharge condition of an electrode is made non-uniform, and the deformation of the electrode and the peeling-off of an active material from a current collector are generated due to the local concentration of an electric field after the repetition of charge-discharge cycles because the uniform dispersion of the metal particles in the carbon material is difficult and the metal is localized in the anode. Accordingly, the cycle performance can be hardly maintained at a higher level.

An $SnB_bP_cO_d$ ("b" is 0.4 to 0.6, "c" is 0.6 to 0.4 and "d" is 1 to 7) metal oxide amorphous material disclosed in WO96/33519 has a problem that the energy density of a battery can be hardly increased to a sufficient level because the irreversible capacity after an initial charge-discharge is larger.

Further, the above prior arts have a common problem that a higher operating voltage cannot be obtained. This is because the operating voltage of the electrode prepared by mixing the metal with the carbon material is lower than that of the anode made of only the carbon since the plateau specific to the metal at a voltage higher than that of the carbon appears on its discharge curve. The lower limit voltage for a lithium secondary battery is prescribed depending on its use. Accordingly, the lower operating voltage narrows the usable region, and consequently the capacity increase in the region where the battery is actually used can be hardly attained.

On the other hand, the anode material containing aluminum and disclosed in JP-A-5(1993)-234583 has a problem of the rapid capacity decrease after the repetition of cycles. The reason thereof seems the formation of a thin insulation film on the aluminum surface generated through a reaction between an impurity such as water existing in an electrolyte and the aluminum.

In the methods disclosed in JP-A-5(1993)-144473, JP-A-5(1993)-234621, JP-A-5(1993)-242911, JP-A-5(1993)-275077 and JP-A-7(1995)-326342 in which the lithium metal or the lithium alloy is mixed with, or added to or affixed to the carbon anode, the improvement of the charge-discharge efficiency is insufficient. This is because, when the carbon is in direct contact with the metal Li or Li alloy, a film is formed on the carbon surface through a reaction between the added metal Li or Li alloy and impurities such as an active functional group on the carbon surface and adsorbed water. The lithium contained in such a film is electrochemically inactive and cannot contribute to the increase of the charge-discharge capacity of the battery. Accordingly, the above methods cannot sufficiently improve the charge-discharge efficiency. Further, the larger electric resistances of these films increase the resistance of the battery to decrease the effective capacity of the battery.

While JP-A-2000-182602 discloses the anode for the secondary battery prepared by affixing the metal foil containing the lithium as the main component on the anode sheet made of an amorphous oxide which enables to insert and extract the lithium, the specific disclosure with respect to the anode sheet made of the amorphous oxide includes active materials such as Sn, Al, B, P and Si solidified with a binder. The non-uniformity of the metal distribution can be microscopically inevitable in the above sheet, thereby generating the local concentration of the electric field.

The direct contact between the binder and the lithium metal foil generates a higher-resistance film by the reaction between the binder and part of the lithium metal foil. Due to the above reasons, the cycle performance can be hardly maintained at a higher level.

Figure 1A:
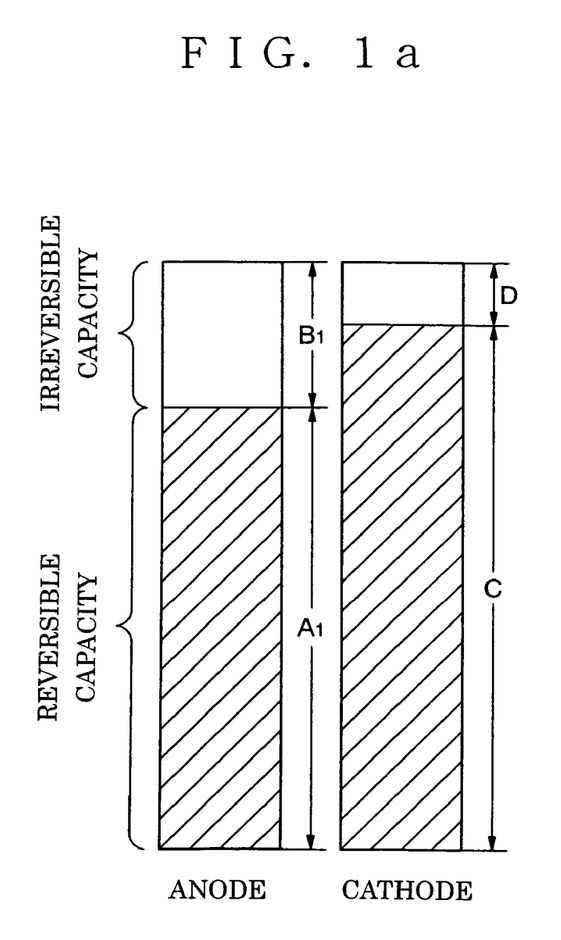
FIG. 1 is a diagram showing the relations between irreversible capacities of a cathode and an anode of a conventional secondary battery.

When a battery is configured to have the same charge-discharge capacities for a cathode and an anode as in an ordinary lithium ion secondary in which the charge-discharge capacity of the anode is larger, the reversible capacity or the capacity usable for the repetitive charge and discharge steps of the cathode is larger than that of the anode as shown in FIG. 1a. The reversible capacity of the battery is the same as that of the anode. That is, the difference $(C_1-A_1)$ between the reversible capacity of the cathode $C_1$ and the reversible capacity of the anode $A_1$ does not contribute to the reversible capacity of the battery, thereby maintaining the energy efficiency to be lower.

Figure 1B:
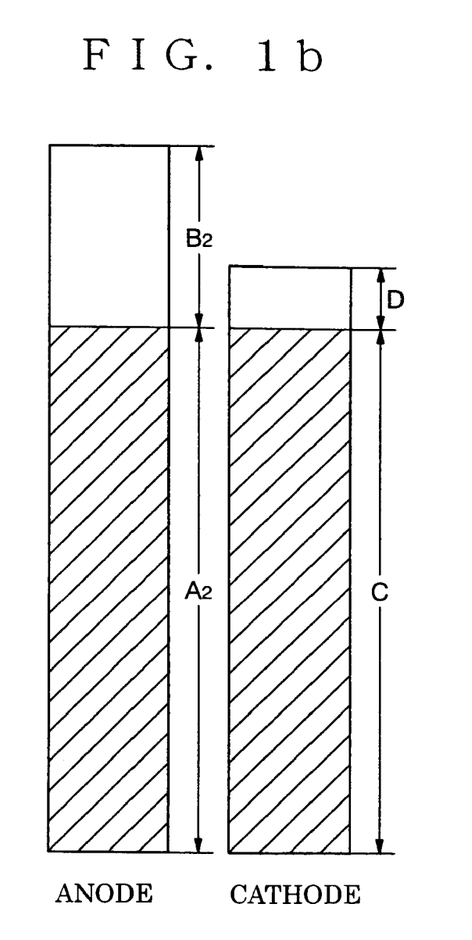

In the lithium secondary battery, the charge and the discharge can be performed most efficiently when the reversible capacities of the cathode and the anode are equal to each other. When, upon considering this, a reversible capacity of the whole anode $A_2$ is made equal to the reversible capacity of the cathode C by increasing the capacity of the anode by an amount of $(C_1-A_1)$ as shown in FIG. 1b, the secondary battery excellent in its energy efficiency seems obtainable. However, in the secondary battery, the ratio itself between the reversible capacity and the irreversible capacity of the anode remains unchanged, and its irreversible capacity increases from $B_1$ to $B_2$.

Since the irreversible capacity part of the anode is at first compensated with the lithium component of the reversible capacity part of the cathode and then the reversible capacity part of the anode is charged, the energy efficiency of the secondary battery including the cathode and the anode having the capacities shown in FIG. 1b is not guaranteed to increase, and is likely to decrease. As described, the improvement of the energy efficiency in the method of relatively adjusting the capacities as shown in FIGS. 1a and b has its limit. It is most desirable that the reversible capacity of the anode is made equal or close to that of the cathode by increasing the ratio of the reversible capacity with respect to the irreversible capacity of the anode.

SUMMARY OF THE INVENTION

Accordingly, it is desirable to provide an anode for a secondary battery having an increased reversible capacity in a voltage region in which the, battery is actually used while maintaining a higher charge-discharge efficiency and an excellent cycle performance in view of the above problems of the prior art; a secondary battering using the same; and a method of fabricating the anode.

In accordance with one embodiment of the present invention, the anode for the secondary battery capable of inserting and extracting a lithium ion can be provided which includes a first layer containing carbon as a main component, a second layer made of a film-like material through which a lithium component passes; and a third layer containing lithium and/or a lithium-containing compound, and the second layer is sandwiched between the first layer and the third layer.

As described, the multi-layered structure is employed in the present invention which includes a first anode layer (the first layer) having the carbon as the main component, a second anode layer (the second layer) made of the film-like material through which the lithium component passes; and a third anode layer (the third layer) containing the lithium and/or the lithium-containing compound as a main component. In the battery including this anode and a cathode capable of inserting and extracting lithium ions, the higher charge-discharge efficiency and discharge capacity are compatible because the Li in the third anode layer in the anode efficiently compensates the irreversible capacity of the anode. Part of the Li in the third anode layer is doped into the second anode layer (the second layer) to improve the permeability of the lithium component in the second anode layer (the second layer). The uniform existence of the film-like material having such higher permeability of the lithium component in the anode makes uniform the electric field distribution between the cathode and the anode. As a result, the excellent cycle performance can be realized by preventing the local concentration of the electric field.

Further, in accordance with the battery using the anode of the present invention, because the structure of the anode includes the lithium alloy having the excessive lithium with respect to the theoretical composition at the fully charged condition, the excellent cycle performance can be obtained by suppressing the generation of dendrite and the reaction with the other layers such as the carbon-containing layer.

If a metal selected from Si, Ge, Ag, Sn, In and Pb is contained in the second layer made of the film-like material having the lithium ion conductivity and the second layer is an amorphous structure, the battery capacity can be increased while maintaining the higher operating voltage and the higher charge-discharge efficiency.

The reason thereof is that the doping and the dedoping of the Li in and from the amorphous structure occur at a potential lower than that of the doping and the dedoping in and from a crystal structure.

The battery having the higher energy density and the excellent cycle performance can be obtained by adjusting the ratio of the reversible capacity of the anode with respect to that of the cathode in a range from 1.0 to 1.3 in the present invention.

DETAILED DESCRIPTION OF VARIOUS EMBODIMENTS

It is conjectured that advance addition of an amount of metal lithium equal to an irreversible amount of an anode to an anode carbon material decreases the irreversible capacity of the battery to increase the energy density. However, the mere combination of these materials hardly increases the actual energy density of the battery. The reasons thereof are set forth in "Background Art".

Consequently, as an anode for a secondary battery capable of inserting and extracting lithium ions, a multi-layered structure is employed including a first layer containing carbon as a main component, a second layer made of a film-like material through which a lithium component passes; and a third layer containing lithium and/or a lithium-containing compound. The film-like material in the second layer refers to a material forming a film of nearly uniform composition different from a particulate material, and the film-like material is formed by a method such as an evaporation method, a CVD method and a sputtering method. Particulate coagulated with a bonding agent through which the lithium component can pass is not included in the film-like material of the present invention. "Main component" in the present invention refers to a component of which a content is over 50% in weight and 100% in weight or less. Further, "lithium component" in the present invention refers to either or both of lithium and a lithium ion.

The establishment of the second layer in the anode for the secondary battery of the present invention suppresses the direct reaction between the active sites of the anode and the metal lithium so that the lithium added to the third layer efficiently compensates the irreversible capacity of the carbon anode.

Part of the added lithium is doped into the film-like material of the second layer through which the lithium component can pass, thereby increasing the lithium component concentration of the film-like material to increase the number of electronic charge carriers on the film-like material or to increase the conductivity. Consequently, the electronic conductivity or the ion conductivity of the second layer is increased to extremely reduce the harmful effect to the high-rate discharging characteristic by means of the second layer.

In one embodiment, the anode of the present invention has the above multi-layered structure and makes uniform the electric field distribution between the cathode and the anode. Accordingly, the electric field is not locally concentrated, and the stable battery characteristics can be obtained without generating a fracture such as the peel-off of the anode components from a current collector after a number of the cycles. In case of the non-uniform electric field distribution, the anode components may locally swell to cause the deterioration of the battery characteristics. Impurities such as a bonding agent are likely to be reacted with the metal lithium to form a film having a higher resistance, thereby deteriorating the battery characteristics. The anode of the present invention using the film-like material can solve the above problems.

The evaporation method for the second layer or the third layer hereinafter described includes an electron beam heating method, an ion beam heating method, a resistance heating method, a high-frequency induction heating method and an ion plating method. The shapes of the material for evaporation include a granulate, a block, a plate and a tablet, and are not especially restricted. The material for evaporation is placed in a vessel such as a hearth, a crucible and a basket. While the pressure at the time of the evaporation may be an ambient pressure or less, the pressure inside of the vacuum vessel is preferably adjusted to $10^{-3}$ Pa or less before the evaporation, thereby removing moisture and impurities adsorbed on the anode, the material for evaporation and the vacuum vessel to provide a clean film. Electron beam released from a deflection electron gun or a Pearce electron gun is used for melting the material for evaporation. The electron beam may be scanned on the material for evaporation for melting. Arc discharge, hollow cathode discharge and high-frequency excitation discharge can be used in the ion plating method. Further, the (wired) basket or the crucible may be heated to melt the material for evaporation placed therein, thereby ionizing the evaporated particles to obtain a film with excellent adhesion.

The rate of evaporation on a sample is preferably between 0.1 nm/sec. and 100 nm/sec. both inclusive. The rate of deposition below 0.1 nm/sec. is so slow that the productivity is insufficient. On the other hand, the film becomes porous and brittle not to perform its function over 100 nm/sec. The shortest distance from the top surface to the evaporation surface (anode surface) in the vessel such as the hearth, the crucible and the basket for accommodating the material for evaporation is preferably between 50 mm and 150 cm both inclusive. This is because the anode is damaged by receiving the radiation heat from the vessel during the evaporation when the distance between the vessel and the evaporation surface is too short. Further, the deposition rate is slow enough to arise a problem in connection with productivity over 150 cm. The anode may be cooled during the evaporation or in a process before or after the evaporation to reduce the damage by the deposition of the material for evaporation.

The film-forming method in accordance with the sputtering method for the second layer or the third layer includes direct current sputtering, alternate current sputtering, bias sputtering, high-frequency sputtering, magnetron sputtering, ECR sputtering, ion beam sputtering, bias sputtering, reactive sputtering, plasma sputtering and the combination thereof. An inert gas such as Ar, Xe, $N_2$ and a mixed gas thereof are used as a source gas of the sputtering plasma. The positional relation between the sputtering target and the anode is such that the target is higher and the anode is lower, or the anode is higher and the target is lower. While the pressure at the time of the evaporation may be an ambient pressure or less, the pressure inside of the vacuum vessel is preferably adjusted to $10^{-3}$ Pa or less before the evaporation. The distance between the target and the anode is preferably between 50 mm and 500 mm both inclusive. While the anode is damaged due to the influence of the plasma below 50 mm, a problem in connection with productivity is arisen over 500 mm because of the slow deposition rate. The ion energy for sputtering the target is preferably between 100 eV and 150 eV both inclusive. While a problem in connection with productivity is arisen below 100 eV because the sputtering yield is reduced to decrease the deposition rate, the sputtering yield is reduced to decrease the deposition rate over 150 eV because the ion is not sputtered but added to the target.

The vapor phase growth method (CVD method) for the second or third layer includes a thermal CVD method, an MOCVD method, a photo-induced CVD method, a plasma CVD method, an ECR plasma CVD method and a microwave CVD method. Monosilane, disilane, trisilane or TEOS ($Si(OC_2H_5)_4$) can be used for Si deposition.

The pressure of the reaction vessel is preferably between 1 Pa and $10^4$ Pa both inclusive. The gas can be supplied directly from the gas phase, or a vapor generated by heating the solid may be used.

In another embodiment, the present invention is also a secondary battery using the above anode, and is characterized in that the anode has the total lithium component of the first layer and the second layer which is excessive with respect to the theoretical composition at the fully charged condition. The theoretical composition herein refers to the maximum value of the lithium containable in a compound when a certain substance and the lithium generate the compound. The fully charged condition herein refers to a condition where the voltage of the anode of the battery is from 0 to 0.01 V with respect to that of a lithium metal electrode.

The theoretical compositions of various types of the lithium alloys are described, for example, in "Densi Zairyou (Electronic Material)", April, 2001, Vol.40, No.4, p78, published on Apr. 1, 2001 by Kogyochousakai Publishing Co., Ltd. The below values are the upper limit values of the lithium alloy compositions, and an alloy containing the lithium above the below compositions cannot be obtained in accordance with an ordinary alloy fabricating method. Although the alloy having the lithium amount larger than the theoretical value is not generally present as described, the lithium component is supposed to enter into a gap in a crystal lattice of the alloy or to be adhered on the surface in the anode for lithium secondary battery containing the excessive lithium component with respect to the theoretical composition.

LiSi alloy: $Li_4Si$
LiSn alloy: $Li_{4.4}Sn$
LiCd alloy: $Li_3Cd$
LiSb alloy: $Li_3Sb$
LiPb alloy: $Li_{4.4}Pb$
LiZn alloy: LiZn
LiBi alloy: $Li_3Bi$ The theoretical composition value of graphite is $LiC_6$, and that of a material inserting no Li is zero.

When the charge and the discharge are repeated to the anode of the multi-layered structure including the first to third layers, the lithium contained in the third layer is doped into the first layer (first anode layer) and the second layer, and the third layer gradually disappears. During this process, a second layer containing the lithium is generated. The anode itself having the second layer containing the lithium contributes to the realization of the excellent battery performance through the standpoint different from the above three-layered structure.

The second layer of the present invention originally has the electro-conductivity which is further increased by the doping of the lithium through the charging and the discharging. Such a film having the higher electro-conductivity never hindering the charge-discharge reaction elevates the battery characteristics by acting as a protection film for suppressing a side reaction between electrolyte and an active material.

In another embodiment, the present invention further provides a secondary battery using the anode with the multi-layered structure in which the cathode contains a lithium-containing transition metal oxide and a ratio of the reversible capacity of the anode with respect to that of the cathode is in a range from 1 to 1.3.

The reversible capacity refers to a dischargeable capacity in the charged capacity. The irreversible capacity refers to a capacity obtained by subtracting the reversible capacity from the charged capacity. The charge-discharge efficiency refers to a ratio of the discharging capacity with respect to the charging capacity.

The discharging capacities, the charging capacities and the charge-discharge efficiencies of the cathode and the anode can be measured by using a coin cell in which an excess amount of lithium metal with respect to the desorption or absorption amount of the lithium in the cathode or the anode is used in the counter electrode.

When the charge-discharge efficiencies of the cathode and the anode of the secondary battery are different from each other and the secondary battery is designed such that the cathode and the anode have the same charging capacities, the reversible capacity of the battery becomes the same as that of either one of the electrodes having the lower charge-discharge efficiency.

In the case of the conventional secondary battery using the lithium-containing transition metal oxide such as $Li_eCoO_2$ and $Li_fMn_2O_4$ (wherein "e" is $0<e\leq1.1$ and "f" is $0<f\leq1.4$) in the cathode, and the carbon such graphite and hard carbon in the anode, the irreversible capacity of the battery is determined by that of the anode because the charge-discharge efficiency of the carbon is generally lower than that of the lithium-containing transition metal oxide. When, accordingly, the secondary battery is designed such that the cathode and the anode have the same charging capacities, not all the reversible capacity of the cathode can be used for that of the battery to decrease the capacity efficiency.

Also in the case of designing the secondary battery such that the cathode and the anode have the same reversible capacities, not all the reversible capacity of the cathode can be utilized for that of the battery because the irreversible capacity of the anode becomes larger compared with the case that the secondary battery is designed such that the cathode and the anode have the same charging capacities. In this case, the reversible capacity of the battery is further reduced compared with the case that the secondary battery is designed such that the cathode and the anode have the same charging capacities.

In the conventional secondary battery formed by combining the cathode and the anode having the different charge-discharge efficiencies, it is impossible to utilize all the reversible capacity of the electrode having the higher charge-discharge efficiency as the reversible capacity of the battery by merely controlling the ratio between the cathode and the anode.

As described, since the lithium in the third layer compensates the irreversible capacity of the anode in the battery of the present invention, the charge-discharge efficiencies of the cathode and the anode can be nearly equal to each other eventually so that the reversible capacity of the cathode is not wasted even when the anode having the larger irreversible capacity is used. Accordingly, the energy density of the battery can be increased.

In the present invention, when the ratio of the reversible capacity of the anode with respect to that of the cathode in the battery is from 1 to 1.3, the cycle performance becomes excellent in addition to the increase of the higher energy density of the battery.

When the ratio of the reversible capacity of the anode with respect to that of the cathode is below 1, the cycle performance becomes worse because not all the lithium ions released from the cathode during the charging can be inserted in the anode. When the ratio of the reversible capacity of the anode with respect to that of the cathode is over 1.3, the amount of the anode contained in the battery becomes larger to reduce the energy density of the battery.

In accordance with the present invention, a method of fabricating the anode having the multi-layered structure is provided including the steps of forming the first layer containing the carbon as the main component on the current collector, forming the second layer containing the film-like material as the main component through which the lithium component passes on the first layer, and forming the third layer containing the lithium and/or the lithium-containing compound.

Further, in accordance with the present invention, the method of fabricating the anode having the multi-layered structure is provided in which at least one of the second and third layers is fabricated by using an evaporation method, a CVD method or a sputtering method employing a plurality of evaporation sources, gases or targets.

In the present invention, each of the first, second and third layers may be either singular or plural. In connection with the positional relation among the first, second and third layers, the first and third layers shall not be in direct contact with each other and the second layer is interposed therebetween. When a plurality of the first, second or third layers are present, any stacked structure can be employed provided that the first layer is not in direct contact with the third layer. That is, any one of the following configurations may be employed.

(a) Configuration in which the first layer is disposed on the outermost surface of the electrode.

(b) Configuration in which the second layer is disposed on the outermost surface of the electrode.

(c) Configuration in which the third layer is disposed on the outermost surface of the electrode.

A configuration in which multi-layered films composed of the second and third layers are disposed on the top and bottom surfaces of the first layer such that the first layer is sandwiched between the second layers, and another configuration in which multi-layered films composed of the first and second layers are disposed on the top and bottom surfaces of the third layer such that the third layer is sandwiched between the second layers may be employed. The configuration in which the first layer is sandwiched between the second layers or the third layer is sandwiched between the second layers can further increase the battery capacity while maintaining the higher charge-discharge efficiency and the excellent cycle performance.

In the above configuration in which the second layer is disposed on the outermost surface of the electrode, the outermost second layer contributes to the increase of the lithium component usable for the charge and the discharge after the absorption of the lithium component from the third layer though the second layer does not exert its function of preventing the direct contact between the first and third layers.

In the present invention, the second layer is preferably made of the material capable of inserting and extracting the lithium component. The absorption of the lithium component includes the formation of alloy and the incorporation of the lithium into the structure without forming alloy. The second layer is preferably an amorphous structure. The electrochemical doping and dedoping of the lithium in and from the amorphous structure take place at a potential lower than that of a crystal structure so that the battery capacity can be increased while the higher operating voltage and the higher charge-discharge efficiency are maintained. The amorphous in the present invention refers to a structure with a broader scattering band having a peak at 15 to 40 degree as a $2\theta$ value calculated with an X-ray diffraction method using $CuK\alpha$ ray.

The amorphous structure is more excellent in its strength against an external stress than a crystalline structure because of its isotropic structure, and is chemically stable. Accordingly, the amorphous structure hardly reacts with electrolyte, is excellent in stability after the repetition the cycles of the charging and discharging, and hardly generates the capacity deterioration.

The second layer is preferably formed by means of the evaporation method, the CVD method or the sputtering method. In accordance with these film-forming methods, an amorphous film can be formed uniformly on the anode. The film makes uniform the electric filed distribution between the cathode and the anode. Accordingly, the electric field is not locally concentrated, and no failure takes place such as peeling-off of the anode structure from the current collector after the cycles, thereby providing the stable battery characteristics.

While the material forming the second layer of the present invention is not especially restricted provided that the lithium component passes therethrough, the material preferably contains one or more metals selected from the group consisting of Si, Ge, Ag, In, Sn and Pb. These materials can insert and extract the lithium or the lithium ion. By selecting such materials and providing the amorphous structure, the battery capacity can be increased while the higher operating voltage and the higher charge-discharge efficiency are maintained. When the second layer is made of one or more materials selected from the group consisting of Si, Ge, Sn, Pb and oxides of these metals, the operating voltage, the higher charge-discharge efficiency and the battery capacity can be remarkably improved, and in addition the easy fabrication can be attained. Among these, Si, Sn and their oxides provide a smaller structure change when the lithium is inserted, are hardly deteriorated after the repetition of the charging and the discharging and provide the excellent cycle performance.

The material forming the third layer of the present invention is not especially restricted if it is lithium and/or a lithium-containing compound, and preferably includes metal lithium, lithium alloy, lithium nitride, $Li_{3-g}M_gN$ (M=Co, Ni, Cu, and g is 0<g<3) and a mixture thereof. Since such a material can electrochemically release much lithium, the irreversible capacity of the anode can be compensated to improve the charge-discharge efficiency of the battery.

The material of the third layer of the present invention preferably has an amorphous structure. The amorphous structure is less reactive with electrolyte than a crystalline structure because the amorphous structure is structurally isotropic and chemically stable. Accordingly, the lithium contained in the third layer is efficiently utilized for compensating the irreversible capacity of the anode.

The third layer of the present invention is preferably formed by means of the evaporation method, the CVD method or the sputtering method. In accordance with these film-forming methods, a uniform amorphous film can be formed on the whole anode. Without necessity of using a solvent, a side reaction hardly takes place, thereby providing the layer with higher purity. The lithium contained in the third layer is efficiently utilized for compensating the irreversible capacity of the anode.

When the second layer and/or the third layer in the present is made of two or more elements, the layer is preferably fabricated by using the evaporation method, the CVD method or the sputtering method employing a plurality of evaporation sources, gases or targets. The use of the plurality of the evaporation sources, gases or targets facilitates the control of the ratio between the elements contained in the second and third layers.

Then, embodiments of the anode for the secondary battery in accordance with the present invention will be described referring to the annexed drawings.

Figure 2:
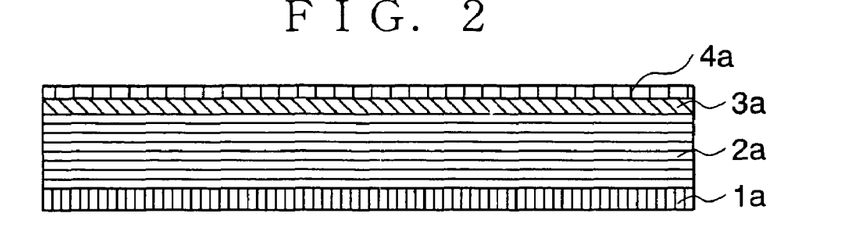
FIG. 2 is a sectional view of an anode of a non-aqueous electrolyte secondary battery in accordance with a first embodiment of the present invention.

FIG. 2 is a sectional view of an anode of a non-aqueous electrolyte secondary battery in accordance with a first embodiment of the present invention.

A current collector 1a is an electrode for taking out current outside of a battery and externally supplying current into the battery during the charging and discharging. The current collector 1a is made of a conductive metal foil such as aluminum, copper, stainless steel, gold, tungsten and molybdenum.

A first anode layer 2a (first layer) is an anode element inserting or extracting lithium during the charge and the discharge. The first anode layer 2a is carbon capable of inserting Li such as graphite, fullerene, carbon nano-tube, DLC (diamond like carbon), amorphous carbon, hard carbon and a mixture thereof.

The second anode layer 3a (second layer) is made of the film-like material through which the lithium or the lithium component passes. Such a material includes $B_2O_3$, $P_2O_5$, $W_hO_{3h-1}$ (h=1,2,3,4), $Mo_iO_{3i-1}$ (i=1,2,3,4), TiO, $TiO_2$, Si, Ge, Ag, Sn, In, Pb, their composite oxide and composite sulfide, and the materials can be used singly or in combination. Lithium halide and lithium chalcogenide may be added thereto to increase the lithium ion-conductivity. The material is preferably amorphous. The use of the amorphous material makes the potential of the doping and the dedoping of the lithium lower than the use of a crystal material, thereby elevating the operating voltage of the battery. The second anode layer 3a is preferably formed by a method such as the CVD method, the evaporation method and the sputtering method. These methods can form the amorphous layer with the uniform film quality and thickness. The thickness of the second anode layer 3a is preferably from 0.1 to 10 μm.

A third anode layer 4a (third layer) is an anode element made of lithium and/or a lithium-containing compound. Such a material includes metal lithium, lithium alloy, lithium nitride, $Li_{3-g}M_gN$ (M=Co, Ni, Cu, and g is 0<g<3) and a mixture thereof, and can be used singly or in combination. The material is preferably amorphous. The use of the amorphous material suppresses a side reaction with an electrolyte to efficiently utilize the lithium in the material for the compensation of the irreversible capacity. As a result, the initial charge-discharge efficiency of the battery is elevated to increase the energy density. The third anode layer 4a is preferably formed by a method such as a CVD method, an evaporation method and a sputtering method. These methods can form the amorphous layer with the uniform film quality and thickness. In addition to these methods, after a lithium foil is placed on the surface of the second layer to cover the surface, the charging and the discharging are started so that the lithium foil is made to act similarly to the evaporation layer. The thickness of the third anode layer 4a is preferably from 0.2 to 20 μm.

Figure 3:
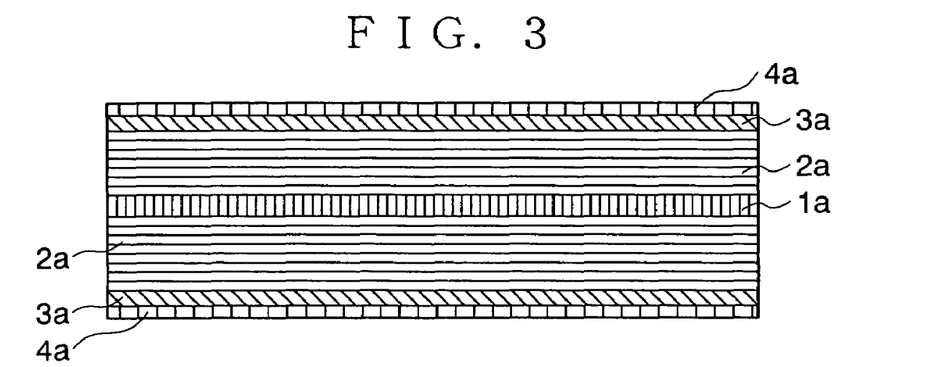
FIG. 3 is a sectional view of an anode of a non-aqueous electrolyte secondary battery in accordance with a second embodiment of the present invention.

A second embodiment of the present invention similar to the first embodiment as shown in FIG. 2 may have a structure including the carbon anodes 2a, the second anodes 3a and the third anodes 4a on the both surfaces of the current collector 1a as shown in FIG. 3.

Figure 4:
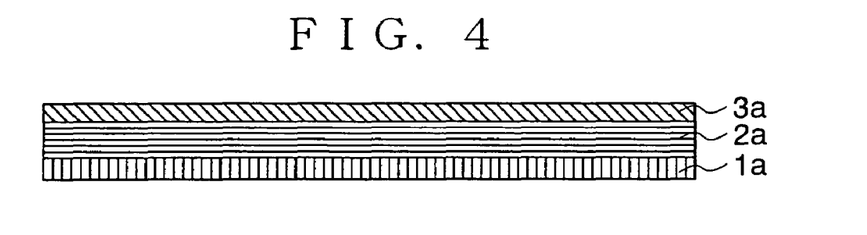
FIG. 4 is a sectional view of an anode of a non-aqueous electrolyte secondary battery in accordance with a third embodiment of the present invention.

FIG. 4 is a sectional view of an anode of a non-aqueous electrolyte secondary battery in accordance with a third embodiment of the present invention. In the anode, the first anode layer 2a is formed on the current collector, and the second anode layer 3a is formed thereon. The first anode layer 2a and the second anode layer 3a contain an excess lithium component with respect to its theoretical composition in a fully charged condition. The theoretical composition of the lithium is as described above.

Figure 5:
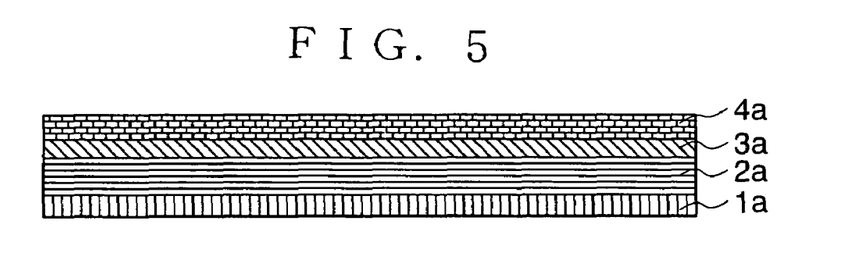
FIG. 5 is a sectional view of an anode of a non-aqueous electrolyte secondary battery in accordance with a fourth embodiment of the present invention.

Although the second anode layer 3a is exemplified to be placed on the first anode layer 2a in FIG. 4, a structure, in accordance with a forth embodiment as shown in FIG. 5, having the third anode layer 4a made of lithium on the surface of the anode which is shown in FIG. 4 in accordance with the third embodiment can be employed.

The cathode usable in the present invention has a structure including a substrate such as an Al foil on which a cathode material is applied. The material includes a dispersed mixture containing a composite oxide identified by $Li_jMO_2$ (M refers to at least one transition metal, and "j" is 0<j<1.4) such as $Li_jCoO_2$, $Li_jNiO_2$, $Li_jMn_2O_4$, $Li_jMnO_3$ and $Li_jNi_kCO_{1-k}O_2$ ("k" is 0<k<); a conductive material such as carbon and a bonding agent such as poly-fluorinated vinylidene (PVDF) in a solvent such as N-methyl-2-pyrrolidone (NMP).

A separator usable in the lithium secondary battery of the present invention includes polyolefin such as polypropylene and polyethylene, and a porous film such as fluorocarbon resin. The electrolyte is used singly or in combination of two or more compounds including cyclic carbonates such as propylene carbonate (PC), ethylene carbonate (EC), butylene carbonate (BC) and vinylene carbonate (VC); linear carbonates such as dimethyl carbonate (DMC), diethyl carbonate (DEC), ethyl methyl carbonate (EMC) and dipropyl carbonate (DPC); aliphatic carbonic acid esters such as methyl formate, methyl acetate and propionic ether; γ-lactones such as γ-butyrolactone; linear ethers such as 1,2-ethoxyethane (DEE) and ethoxymethoxyethane (EME); cyclic ethers such as tetrahydrofuran and 2-methyl tetrahydrofuran; and an aprotic organic solvent such as dimethylsulfoxide, 1,3-dioxolane, formamide, acetamide, dimethylformamide, dioxolane, acetonitril, propylnitril, nitromethane, ethylmonoglyme, triesterphosphate, trimethoxymethane, dioxolane derivatives, sulphorane, methylsulphorane, 1,3-dimethyl-2-imidazolidinone, 3-methyl-2-oxazolidinone, propylene carbonate derivatives, tetrahydrofuran derivatives, ethylether, 1,3,-propane sultone, anisole and n-methylpyrrolidone. A lithium salt dissolvable in the organic solvent is dissolved therein. The lithium salt includes $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, $LiB_{10}Cl_{10}$, lithium-lower aliphatic carboxylate, lithium chloroborate, lithium tetraphenylborate, LiBr, LiI, LiSCN, LiCl and imides. Polymer electrolyte can be used in place of the electrolyte.

The shape of the secondary battery of the present invention is not especially restricted and includes a cylindrical shape, a square shape and a coin shape.

The voltage of the cell immediately after the assembly of the cell (for example, after the electrolyte is immersed and sealed) and before the charging and the discharging is measured to be between 1 V and 3 V both inclusive per one cell. This is because the third anode 4a containing the lithium or the lithium-containing compound is included in the anode. If the third anode 4a is not included, the voltage is below 1V.

The present invention will be described more in detail by referring to the following Examples. The measurements of the charging and the discharging were conducted at 20° C.

EXAMPLE 1

In the present Example, a copper foil and graphite were used as a current collector 1a and the main component of a carbon anode layer 2a, respectively. A second anode layer 3a made of $B_2O_3$ was formed by using a vacuum-evaporation method. A third anode layer 4a made of metal lithium was formed by using a vacuum-evaporation method.

The anode of the non-aqueous electrolyte secondary battery shown in FIG. 2 was fabricated in accordance with the following procedures. The copper foil having thickness of 10 μm was used as the current collector on which the carbon electrode 2a was deposited. The first anode 2a was prepared by applying, on the current collector 1a, paste obtained by mixing graphite powder with poly-fluorinated vinylidene acting as a bonding agent and dissolved in N-methyl-2-pyrrolidone, and an agent for providing conductivity, followed by drying. After the drying, the first anode 2a was compressed by using a pressing machine. After the second anode 3a made of $B_2O_3$ was deposited on the first anode 2a by using a vacuum-evaporation method, the third anode 4a made of lithium was deposited thereon to fabricate an anode.

The reversible capacity of the anode was measured by using a coin cell having metal lithium as a counter electrode. A mixed solvent of ethylene carbonate (EC) and diethyl carbonate (DEC) dissolving 1 mol/liter of $LiPF_6$ (mixed volume ratio: EC/DEC=30/70) was used as electrolyte. Measurement current was 0.1 mA, and a voltage range was 3 to 4.3 V (Li/Li$^+$).

Non-woven propylene cloth was used as a separator, and the mixed solvent of the ethylene carbonate (EC) and the diethyl carbonate (DEC) dissolving 1 mol/liter of $LiPF_6$ (mixed volume ratio: EC/DEC=30/70) was used as electrolyte. A square battery was fabricated by combining the above cathode and anode. The ratio of the reversible capacity of the anode in the battery with respect to that of the cathode was 1.06.

COMPARATIVE EXAMPLES 1 TO 3

Figure 6:
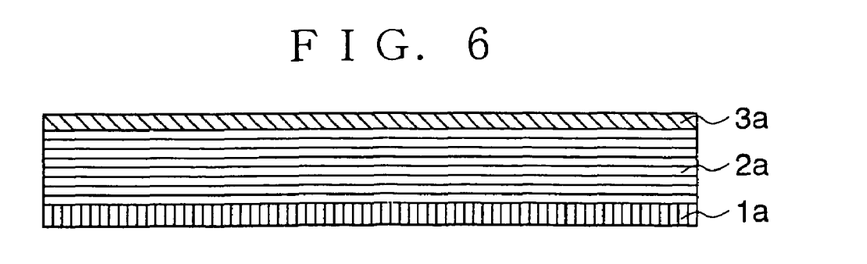
FIG. 6 is a sectional view of an anode of a non-aqueous electrolyte secondary battery of Comparative Example 1.

As Comparative Example 1, a square battery shown in FIG. 6 was prepared by using an anode which includes a current collector 1a made of a copper-foil having thickness of 10 μm, a first anode layer 2a having graphite as a main component and a second anode layer 3a made of $B_2O_3$.

Figure 7:
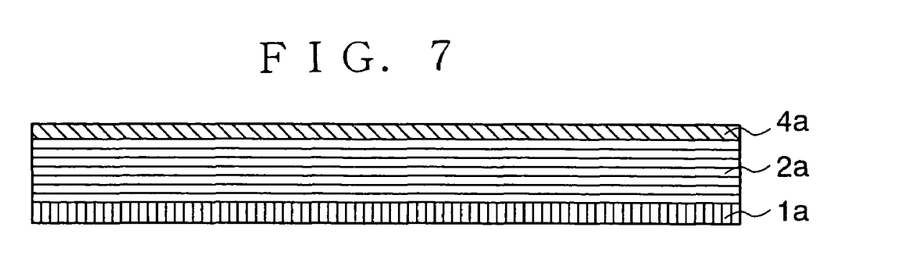
FIG. 7 is a sectional view of an anode of a non-aqueous electrolyte secondary battery of Comparative Example 2 or 3.

As Comparative Example 2, a square battery shown in FIG. 7 was prepared by using an anode which includes a current collector 1a made of a copper-foil having thickness of 10 μm, a first anode layer 2a having graphite as a main component and a second anode layer 4a made of lithium.

As Comparative Example 3, a square battery shown in FIG. 7 was prepared by using an anode which includes a current collector 1a made of a copper-foil having thickness of 10 μm, a first anode layer 2a having graphite as a main component and a second anode layer 4a made of $Li_{3.5}Si$ alloy.

Amounts of the first anode layer 2a in the respective batteries of Comparative Examples 1 to 3 were adjusted to the same as that of Example 1.

The components other than the anodes of Comparative Examples 1 to 3 were the same as those of Example 1.

The voltages before the charging of the battery using the anode of Example 1 (the structure shown in FIG. 1) and of the batteries of Comparative Examples 1, 2 and 3 were measured to be 1.5 V for Example 1, and 0.2 V, 1.6 V and 1.3 V for Comparative Examples 1, 2 and 3, respectively. The charge-discharge cycle tests were conducted on these batteries. The voltage range of the charge-discharge cycle tests was from 3 to 4.3 V.

The results of the initial charge-discharge are shown in Table 1. While the charge-discharge efficiency of Comparative Example 1 was 84.4%, that of Example 1 was 98% or more. The results show that the initial charge-discharge of Example 1 was higher. The charge-discharge efficiencies of Comparative Examples 2 and 3 were as low as 72.3% and 81.4%, respectively, so that it is apparent that the charge-discharge efficiencies could not be improved by merely forming the Li layer or the Li alloy layer on the carbon layer.

TABLE 1

|  | Example 1 | Comp. Ex. 1 | Comp. Ex. 2 | Comp. Ex. 3 |
|---|---|---|---|---|
| Initial Charge Capacity | 152 mAh | 154 mAh | 148 mAh | 153 mAh |
| Initial Discharge Capacity | 149 mAh | 130 mAh | 107 mAh | 125 mAh |
| Initial Charge-Discharge Efficiency | 98.2% | 84.4% | 72.3% | 81.4% |
| Average Discharge Voltage | 3.7 V | 3.6 V | 3.5 V | 3.4 V |

The average discharge voltages of Example 1 and Comparative Examples 1, 2 and 3 were 3.7V, 3.6V, 3.5V and 3.4V, respectively. The reason why the battery of Example 1 has the higher average discharge voltage than that of Comparative Example 2 is that while the lithium layer of Comparative Example 2 reacts with active sites on the carbon surface to form a film having a higher resistance, a part of the lithium layer of Example 1 is doped into the second anode layer 3a to reduce the resistance of the second anode layer 3a. As a result, the resistance of the battery of Example 1 became lower than that of Comparative Example 2 so that the average discharge voltage was higher than that of Comparative Example 2.

Then, the evaluation results of the charge-discharge cycle performances are shown in Table 2. A discharging capacity ratio in Table 2 refers to a ratio of a discharging capacity after 300 cycles with respect to a discharging capacity after one cycle when the latter is defined to be 100%. The discharging capacity ratio after 300 cycles of Example 1 retained 90% or more of the initial capacity and had the cycle performance equal to or more than that of Comparative Example 1. The discharging capacities after 300 cycles of Comparative Examples 2 and 3 were 19.3% and 30.2% with respect to the initial discharging capacities, respectively. This is probably because the Li and the Li alloy formed on the carbon layer react with active sites on the carbon surface to form films having a higher resistance.

TABLE 2

|  | Example 1 | Comp. Ex. 1 | Comp. Ex. 2 | Comp. Ex. 3 |
|---|---|---|---|---|
| Discharging Capacity Ratio(C300/C1) | 90.9% | 87.0% | 19.9% | 30.2% |

The secondary battery having the anode of the present invention was proved to have the higher initial charge-discharge efficiency and the stable cycle performance based on the evaluation results of the present Example.

EXAMPLES 2 AND 3

In these Examples, a copper foil with thickness of 10 μm and hard carbon were used as a current collector 1a and a main components of a first anode layer 2a, respectively. Silicon was used as a second anode layer 3a which was formed by using a CVD method (Example 2) or a sputtering method (Example 3). A third anode layer 4a was made of metal lithium which was formed by using a vacuum-evaporation method. The reversible capacities of the anodes of Examples 2 and 3 were measured by using a coin cell having metal lithium as a counter electrode. A mixed solvent of propylene carbonate (PC) and ethyl methyl carbonate (EMC) dissolving 1 mol/liter of $LiPF_6$ (mixed volume ratio: PC/EMC=40/60) was used as electrolyte. Measurement current was 0.1 mA, and a voltage range was 3 to 4.3 V ($Li/Li^+$).

Non-woven propylene cloth was used as a separator, and a square battery was fabricated by combining the above cathode and anode. The ratios of the reversible capacities of the anodes in the batteries with respect to those of the cathodes were 1.10 in Examples 2 and 3.

The mixed solvent of the propylene carbonate (PC) and the ethyl methyl carbonate (EMC) dissolving 1 mol/liter of $LiPF_6$ (mixed volume ratio: PC/EMC=40/60) was used as electrolyte. The components other than the electrodes were the same as those of the materials of Example 1 to fabricate a square battery.

COMPARATIVE EXAMPLES 4 AND 5

Figure 8:
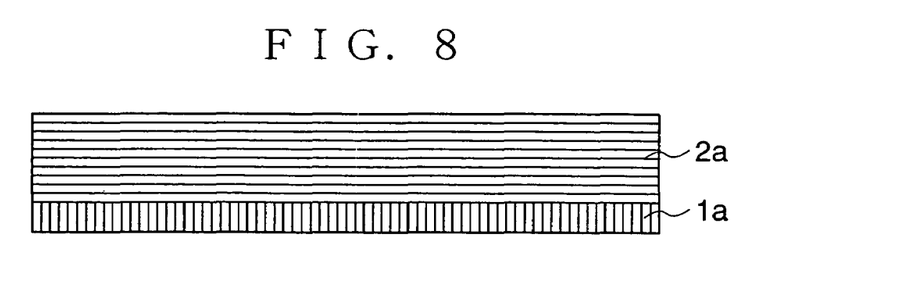
FIG. 8 is a sectional view of an anode of a non-aqueous electrolyte secondary battery of Comparative Example 4.

As shown in FIG. 8, an anode of Comparative Example 4 was prepared including a current collector 1a made of a copper-foil having thickness of 10 μm, and a first anode layer 2a having hard carbon as a main component.

Figure 9:
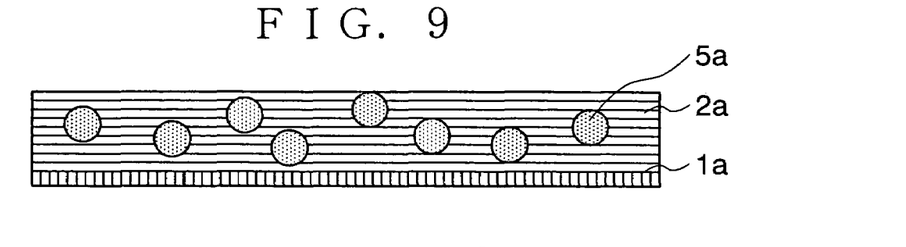
FIG. 9 is a sectional view of an anode of a non-aqueous electrolyte secondary battery of Comparative Example 5.

On the other hand, as shown in FIG. 9, an anode of Comparative Example 5 was prepared including a current collector 1a made of a copper-foil having thickness of 10 μm, a first anode layer 2a having hard carbon as a main component, and silicon powders 5a (powder particle: 20 to 100 μm) dispersed in the first anode layer 2a. The components other than these were the same as those of the materials of Example 2 to fabricate square batteries.

Amounts of the first anode layers 2a having the hard carbon as the main components in the respective batteries of Comparative Examples 4 and 5 were adjusted to the same as those of Examples 2 and 3.

Then, the evaluation results of Examples 2 and 3 and Comparative Examples 4 and 5 will be described. The voltages before the charging of the battery using the anodes of Examples 2 and 3 (the structure shown in FIG. 2) and of the batteries of Comparative Examples 4 and 5 were measured to be 1.4 V for Examples 2 and 3, and 0.1 V and 0.1 V for Comparative Examples 4 and 5. The charge-discharge cycle tests were conducted on these batteries. The voltage range of the charge-discharge cycle tests was from 3 to 4.3 V. The results of the initial charge-discharge are shown in Table 3. While the charge-discharge efficiencies of Comparative Examples 4 and 5 were 58.1% and 40.0%, respectively, those of Examples 2 and 3 were over 90%. The results show that the initial charge-discharge efficiencies of Examples 2 and 3 were higher. Accordingly, even if the hard carbon was used as the main component of the first anode layer, the charge-discharge efficiency could be apparently improved by forming the second anode layer 3a and the third anode layer 4a.

TABLE 3

|  | Example 2 | Example 3 | Comp. Ex. 4 | Comp. Ex. 5 |
|---|---|---|---|---|
| Initial Charging Capacity | 200 mAh | 198 mAh | 152 mAh | 210 mAh |
| Initial Discharging Capacity | 186 mAh | 183 mAh | 88 mAh | 84 mAh |
| Initial Charge-Discharge Efficiency | 93.0% | 92.4% | 58.1% | 40.0% |
| Average Discharge Voltage | 3.6 V | 3.6 V | 3.6 V | 3.4 V |

The reversible capacities of Examples 2 and 3 were 1.3 times or more larger than that of Comparative Example 4, and the containment of the silicon in the second anode layer 3a apparently increased the anode capacity.

The average discharge voltages of Examples 2 and 3 and Comparative Examples 0.4 and 5 were 3.6 V, 3.6 V, 3.6 V and 3.4 V, respectively. The reason that the batteries of Examples 2 and 3 had the average discharge voltage higher than that of Comparative Example 4 is that the dedoping of the lithium contained in the anode 2a into the crystalline silicon in Comparative Example 5 took place at a potential higher than that into the silicon having the amorphous structure of the second anode layer 3a of Examples 2 and 3.

Then, the charge-discharge cycle performances of the anodes of Examples 2 and 3 and Comparative Examples 4 and 5 were measured and shown in Table 4. The discharging capacity ratios after 300 cycles of Examples 2 and 3 retained 90% or more of the initial capacity and had the cycle performances equal to or more than that of Comparative Example 4. The discharging capacity after 300 cycles of Comparative Example 5 was about 10% with respect to the initial discharging capacity. This is probably because the silicon particles in the carbon layer are swollen and contracted due to the charging and the discharging so that the electric contact of the anode is lost to increase the electric resistance.

The secondary battery having the anode of the present invention was proved to have the higher capacity and charge-discharge efficiency and the stable cycle performance based on the evaluation results of the present Example.

TABLE 4

|  | Example 2 | Example 3 | Comp. Ex. 4 | Comp. Ex. 5 |
|---|---|---|---|---|
| Discharging Capacity Ratio(C300/C1) | 90.9% | 92.0% | 89.1% | 9.6% |

EXAMPLES 4, 5 AND 6

In these Examples, a copper foil having thickness of 10 μm and hard carbon were used as a current collector 1a and the main component of a first anode layer 2a, respectively. As a second anode layer 3a, $SiO_x$ ("x" is 0<x<2, Example 4) or $SnO_y$ ("y" is 0<y<2, Example 5) or a mixture of Si and Sn (Example 6) was used. The $SiO_x$ layer and the $SnO_y$ layer were formed by using a evaporation method.

The SiSn layer was formed by using an evaporation method in which Si and Sn were placed in separate crucibles and deposited by using lasers. The ratio between Si and Sn was controlled by measuring the respective amounts of the evaporation with a quartz oscillator.

Lithium-indium alloy was used as a third anode layer 4a. The amounts of the lithium and the indium in the alloy were 98 weight % and 2 weight %, respectively. The lithium-indium alloy film was formed by using an evaporation method in which the lithium and the indium were placed in separate crucibles and deposited by using lasers. The ratio between the lithium and the indium was controlled by measuring the respective amounts of the evaporation with a quartz oscillator.

The reversible capacities of these anodes were measured by using a coin cell having metal lithium as a counter electrode. A mixed solvent of propylene carbonate (PC) and ethyl methyl carbonate (EMC) dissolving 1 mol/liter of $LiPF_6$ (mixed volume ratio: PC/EMC=40/60) was used as electrolyte. Measurement current was 0.1 mA, and a voltage range was 0 to 2.0 V ($Li/Li^+$).

A mixture prepared by dispersing $Li_{1.1}Mn_2O_4$, a conductivity providing agent and poly-fluorinated vinylidene in N-methyl-2-pyrrolidone was applied on an aluminum foil to obtain a cathode. The reversible capacity of the cathode was measured by using a coin cell having metal lithium as a counter electrode. A mixed solvent of propylene carbonate (PC) and ethyl methyl carbonate (EMC) dissolving 1 mol/liter of $LiPF_6$ (mixed volume ratio: PC/EMC=40/60) was used as electrolyte. Measurement current was 0.1 mA, and a voltage range was 3 to 4.3 V ($Li/Li^+$).

A square battery was fabricated by combining the above cathode and anode. The ratios of the reversible capacities of the anodes in the batteries with respect to those of the cathodes in Examples 4, 5 and 6 were 1.23. The components other than the electrodes were the same as those of the materials of Example 2 to fabricate a square battery.

Amounts of the first carbon anode 2a having the hard carbon as the main components in the respective batteries of Examples 4, 5 and 6 were adjusted to the same as those of Comparative Examples 4 and 5.

The voltages before the charging of the batteries using the respective anodes (the structure shown in FIG. 2) of Examples 4, 5 and 6 were measured to be 1.3 V, 1.3 v and 1.4 V, respectively. The charge-discharge cycle tests were conducted on these batteries. The voltage range of the charge-discharge cycle tests was from 3 to 4.3 V. The results of the initial charge-discharge of Examples 4, 5 and 6 are shown in Table 5. All of the charge-discharge efficiencies of Examples 4, 5 and 6 were over 90% higher than those of Comparative Examples 4 and 5 so that it is apparent that the charge-discharge efficiencies could be improved by using the lithium-indium alloy as the third anode layer 4a. The charging capacities of Examples 4, 5 and 6 were 1.3 times or more larger than that of Comparative Example 4, and the containment of the silicon, the tin and their oxides in the second anode layer 3a apparently increased the anode capacity.

TABLE 5

|  | Example 4 | Example 5 | Example 6 | Comp. Ex. 4 | Comp. Ex. 5 |
|---|---|---|---|---|---|
| Initial Charging Capacity | 212 mAh | 221 mAh | 209 mAh | 152 mAh | 210 mAh |
| Initial Discharging Capacity | 186 mAh | 203 mAh | 192 mAh | 88 mAh | 84 mAh |
| Initial Charge-Discharge Efficiency | 93.4% | 91.9% | 91.9% | 58.1% | 40.0% |
| Average Discharge Voltage | 3.6 V | 3.6 V | 3.6 V | 3.6 V | 3.4 V |

The average discharge voltages of Example 4, 5 and 6 were 3.6V. The reason why the batteries of Examples 4, 5 and 6 has the higher average discharge voltages than that of Comparative Example 5 is that the dedoping of the lithium to the crystalline silicon in the first anode layer 2a of Comparative Example 5 takes place at a potential higher than that of the dedoping of the lithium into the silicon, the tin and their oxides having the amorphous structure in the second anode layer 3a of Examples 4, 5 and 6.

Then, the results of the charge-discharge cycle performance measurement of the anodes of Examples 4, 5 and 6 are shown in Table 6 with those of Comparative Examples 4 and 5. The discharging capacity ratios after 300 cycles of Examples 4, 5 and 6 retained 90% or more of the initial capacities and had the cycle performance equal to or more than that of Comparative Example 4.

The secondary battery having the anode of the present invention was proved to have the higher capacity and charge-discharge efficiency and the stable cycle performance based on the evaluation results of the present Example.

TABLE 6

|  | Example 4 | Example 5 | Example 6 | Comp. Ex. 4 | Comp. Ex. 5 |
|---|---|---|---|---|---|
| Discharging Capacity Ratio(C300/C1) | 90.3% | 91.3% | 92.6% | 89.1% | 9.6% |

EXAMPLE 7

In this Example, a copper foil having thickness of 10 μm and hard carbon were used as a current collector $1a$ and the main component of a first anode layer $2a$, respectively. As a second anode layer $3a$, $SiO_x$ ("x" is 0<x<2) was used. The $SiO_x$ layer were formed by using a vacuum-evaporation method. A mixture of metal lithium and lithium nitride was used as a third anode layer $4a$. The contents of the metal lithium and the lithium nitride in the mixture were 90% and 10%, respectively. The layer of the mixture was formed by using an evaporation method in which the metal lithium and the lithium nitride were placed in separate furnaces and deposited by using lasers. The reversible capacity of the anode per unit area was measured by using a coin cell having metal lithium as a counter electrode. A mixed solvent of ethylene carbonate (EC) and diethyl carbonate (DEC) dissolving 1 mol/liter of $LiPF_6$ (mixed volume ratio: EC/DEC=30/70) was used as electrolyte. Measurement current was 0.1 mA, and a voltage range was 0 to 2 V ($Li/Li^+$).

A mixture prepared by dispersing $LiCoO_2$, a conductivity providing agent and poly-fluorinated vinylidene in N-methyl-2-pyrrolidone was applied on an aluminum foil to obtain a cathode. The reversible capacity of the cathode per unit area was measured by using a coin cell having metal lithium as a counter electrode. A mixed solvent of ethylene carbonate (EC) and diethyl carbonate (DEC) dissolving 1 mol/liter of $LiPF_6$ (mixed volume ratio: EC/DEC=30/70) was used as electrolyte. Measurement current was 0.1 mA, and a voltage range was 3 to 4.2 V ($Li/Li^+$).

A square battery was fabricated by combining the above cathode and anode. The ratio of the reversible capacity of the anode in the battery with respect to that of the cathode was 1.08. The other components were the same as those of Example 1.

COMPARATIVE EXAMPLE 6

A square battery was fabricated by using the anode of Comparative Example 2 and the cathode of Example 7.

An amount of the first anode layer $2a$ containing graphite as a main component in Comparative Example 6 was adjusted to be the same as those of Example 7. The other components were the same as those of Example 1.

The charge-discharge cycle tests were conducted on the batteries of Example 7 and Comparative Example 6. The voltage range of the charge-discharge cycle tests was from 3 to 4.2 V. The results of the initial charge-discharge of Example 7 and Comparative Example 6 are shown in Table 7. The charge-discharge efficiency of Example 7 was over 94% higher than that of Comparative Examples 6 so that it is apparent that the charge-discharge efficiency could be improved by using the mixture of the metal lithium and the lithium nitride as the third anode layer $4a$. The charging capacity of Examples 7 was 1.3 times or more larger than that of Comparative Example 6, and the containment of the silicon oxide in the second anode layer $3a$ apparently increased the anode capacity.

TABLE 7

|  | Example 7 | Comp. Ex. 6 |
|---|---|---|
| Initial Charging Capacity | 222 mAh | 154 mAh |
| Initial Discharging Capacity | 210 mAh | 111 mAh |
| Initial Charge-Discharge Efficiency | 94.6% | 72.1% |
| Average Discharge Voltage | 3.6 V | 3.4 V |

The average discharge voltage of Example 7 was 3.6V. The reason why the battery of Example 7 has the higher average discharge voltage than that of Comparative Example 6 is that while the lithium layer of Comparative Example 6 reacts with active sites on the carbon surface to form a film having a higher resistance, a part of the lithium layer of Example 7 is doped into the second anode layer $3a$ to reduce the resistance of the second anode layer $3a$. As a result, the resistance of the battery of Example 7 became lower than that of Comparative Example 6 so that the average discharge voltage was higher than that of Comparative Example 6.

Then, the results of the charge-discharge cycle performance measurement of the batteries of Example 7 and Comparative Example 6 are shown in Table 8. Example 7 retained 90% or more of the initial capacity after 300 cycles which apparently surpassed Comparative Example 6 and had the cycle performance equal to or more than that of Comparative Examples 1 and 4.

The secondary battery having the anode of the present invention was proved to have the higher capacity and charge-discharge efficiency and the stable cycle performance based on the evaluation results of the present Example.

TABLE 8

|  | Example 7 | Comp. Ex. 6 |
|---|---|---|
| Discharging Capacity Ratio(C300/C1) | 90.3% | 87.0% |

EXAMPLES 8 AND 9

Figure 10:
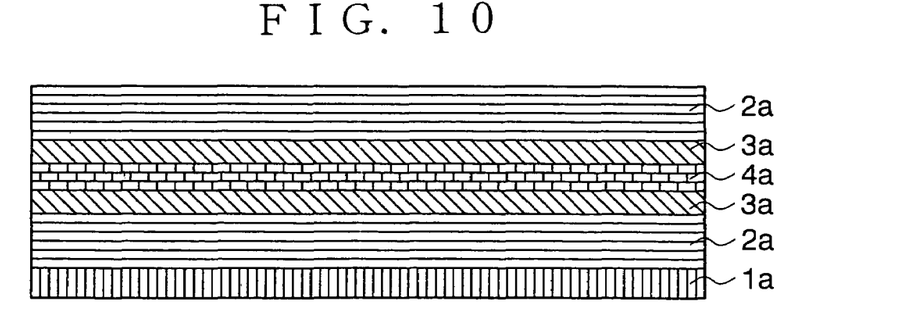
FIG. 10 is a sectional view of an anode of a non-aqueous electrolyte secondary battery of Example 8.
Figure 11:
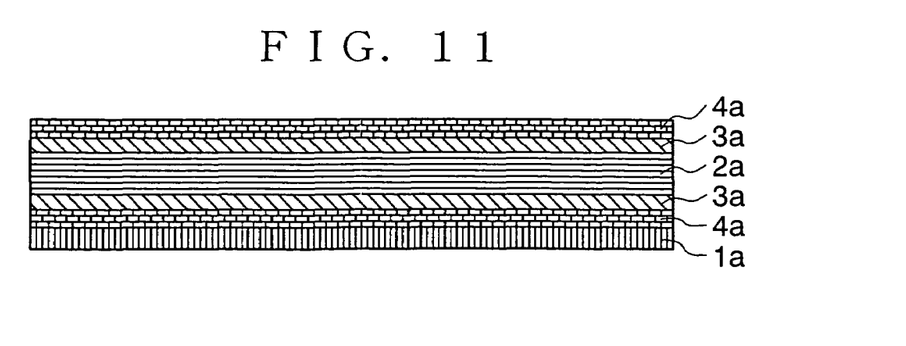
FIG. 11 is a sectional view of an anode of a non-aqueous electrolyte secondary battery of Example 9.

Anodes of Examples 8 and 9 are shown in FIGS. 10 and 11, respectively. In Examples 8 and 9, a copper foil having thickness of 10 μm and graphite were used as a current collector $1a$ and the main component of a first anode layer $2a$, respectively. Silicon was used as a second anode layer $3a$ which was formed by using a vacuum-evaporation method. Metal lithium was used as a third anode layer $4a$ which was formed by using the vacuum-evaporation method. As shown in FIG. 10, the third anode layer $4a$ was sandwiched between a pair of the second anode layers $3a$ in the vertical direction in Example 8. As shown in FIG. 11, the first anode layer $2a$ was sandwiched between a pair of the second anode layers 3a in the vertical direction in Example 9. The reversible capacities of the respective anodes were measured by using a coin cell having metal lithium as a counter electrode. A mixed solvent of ethylene carbonate (EC) and diethyl carbonate (DEC) dissolving 1 mol/liter of $LiPF_6$ (mixed volume ratio: EC/DEC=30/70) was used as electrolyte. Measurement current was 0.1 mA, and a voltage range was 0 to 2 V (Li/Li$^+$).

A square battery was fabricated by combining the above anode and cathode of Example 1. The ratio of the reversible capacity of the anode in the battery with respect to that of the cathode in the battery was 1.06. Amounts of the first carbon anodes 2a included in the respective batteries of Examples 8 and 9 were adjusted to the same as those of the batteries of Comparative Examples 1, 2 and 3. The other components were the same as those of Example 1.

The charge-discharge cycle tests were conducted on the batteries using the anodes (the structure shown in FIG. 2) of Examples 8 and 9. The voltage range of the charge-discharge cycle tests was from 3 to 4.3 V. The results of the initial charge-discharge of Examples 8 and 9 are shown in Table 9. All of the charge-discharge efficiencies of Examples 8 and 9 were over 90% higher than those of Comparative Examples 1, 2 and 3 so that it is apparent that the charge-discharge efficiencies could be improved. The capacities of Examples 8 and 9 were 1.3 times or more larger than that of Comparative Example 1, and the containment of the silicon in the second anode layer 3a apparently increased the anode capacity.

TABLE 9

| | Example 8 | Example 9 | Comp. Ex. 1 | Comp. Ex. 2 | Comp. Ex. 3 |
|---|---|---|---|---|---|
| Initial Charging Capacity | 222 mAh | 207 mAh | 154 mAh | 148 mAh | 153 mAh |
| Initial Discharging Capacity | 212 mAh | 197 mAh | 130 mAh | 107 mAh | 134 mAh |
| Initial Charge-Discharge Efficiency | 95.4% | 91.2% | 84.4% | 72.3% | 87.4% |
| Average Discharge Voltage | 3.7 V | 3.7 V | 3.6 V | 3.5 V | 3.7 V |

The average discharge voltages of Example 8 and 9 were 3.7V. The reason why the batteries of Examples 8 and 9 have the higher average discharge voltage than that of Comparative Example 2 is that while the lithium layer of Comparative Example 2 reacts with active sites on the carbon surface to form a film having a higher resistance, part of the lithium layers of Examples 8 and 9 are doped into the second anode layer 3a to reduce the resistance of the second anode layer 3a. As a result, the resistances of the batteries of Examples 8 and 9 became lower than that of Comparative Example 2 so that the average discharge voltages of Examples 8 and 9 were higher than that of Comparative Example 2.

Then, the results of the charge-discharge cycle performance measurement of the batteries of Examples 8 and 9 are shown in Table 10 together with those of Comparative Examples 2 and 3.

The discharging capacities after 300 cycles of Examples 8 and 9 retained 90% or more of the initial capacities and had the cycle performance equal to or more than that of Comparative Examples 1 and 3. As described, even if the anode had the multi-layered structure including four or more layers, the charge-discharge efficiency, the capacity and the cycle performance could be apparently improved.

The secondary battery having the anode of the present invention was proved to have the higher capacity and charge-discharge efficiency and the stable cycle performance based on the evaluation results of the present Example.

TABLE 10

| | Example 8 | Example 9 | Comp. Ex. 2 | Comp. Ex. 3 |
|---|---|---|---|---|
| Discharging Capacity Ratio(C300/C1) | 90.3% | 90.0% | 19.9% | 90.2% |

EXAMPLES 10 TO 15

In Examples 10 to 15, mixtures prepared by dispersing hard carbon, a conductivity providing agent and poly-fluorinated vinylidene in N-methyl-2-pyrrolidone were applied on copper foils to obtain first anode layers 2a. Six pieces of the electrodes having amounts of the first anode layers 2a per unit area different from one another were fabricated by controlling the applied amounts (Examples 10 to 15). Silicon was applied on these electrodes by means of vacuum-evaporation to form second anode layers 3a. Further, metal lithium was vacuum-vapor-deposited for making second anode layers 4a, thereby fabricating the six electrodes.

A mixture prepared by dispersing $Li_{1.1}Mn_2O_4$, a conductivity providing agent and poly-fluorinated vinylidene in N-methyl-2-pyrrolidone was applied on an aluminum foil to obtain a cathode. The reversible capacity of the cathode was measured by using a coin cell having metal lithium as a counter electrode. A mixed solvent of propylene carbonate (PC) and ethyl methyl carbonate (EMC) dissolving 1 mol/liter of $LiPF_6$ (mixed volume ratio: PC/EMC=40/60) was used as electrolyte. Measurement current was 0.1 mA, and a voltage range was 3 to 4.3 V (Li/Li$^+$).

A square battery was fabricated by combining the above cathode and anode while using non-woven propylene cloth as a separator. The reversible capacities of the respective anodes were measured by using a coin cell having metal lithium as a counter electrode. A mixed solvent of propylene carbonate (PC) and ethyl methyl carbonate (EMC) dissolving 1 mol/liter of $LiPF_6$ (mixed volume ratio: PC/EMC=40/60) was used as electrolyte. Measurement current was 0.1 mA, and a voltage range was 0 to 2 V (Li/Li$^+$). The ratios of the reversible capacities of the anodes in the batteries with respect to those of the cathodes were adjusted to be 0.9 in Example 10, 1.0 in Example 11, 1.1 in Example 12, 1.2 in Example 13, 1.3 in Example 14 and 1.4 in Example 15.

The charge-discharge cycle tests were conducted on the batteries using the anodes (the structure shown in FIG. 2) of Examples 10 to 15. The voltage range of the charge-discharge cycle tests was from 3.0 to 4.3 V. The results of the initial charge-discharge of Examples 10 to 15 are shown in Table 11.

TABLE 11

|  | Initial Charging Capacity | Initial Discharging Capacity | Initial Charge-Discharge Efficiency | Average Discharge Voltage |
|---|---|---|---|---|
| Example 10 | 224 mAh | 196 mAh | 87.3% | 3.7 V |
| Example 11 | 230 mAh | 223 mAh | 97.2% | 3.7 V |
| Example 12 | 230 mAh | 219 mAh | 95.1% | 3.7 V |
| Example 13 | 234 mAh | 218 mAh | 93.3% | 3.7 V |
| Example 14 | 235 mAh | 216 mAh | 92.0% | 3.7 V |
| Example 15 | 230 mAh | 198 mAh | 86.0% | 3.7 V |

When the ratios of the reversible capacities of the anodes with respect to those of the cathodes in the batteries are from 1 to 1.3, the discharge capacities of the batteries were apparently larger based on the results shown in Table 11.

Then, the results of the charge-discharge cycle performance measurement of the batteries of Examples 10 to 15 are shown in Table 12.

When the ratios of the reversible capacities of the anodes with respect to those of the cathodes in the batteries are from 1 to 1.3, the cycle performances of the batteries were apparently excellent.

The secondary battery having the anode of the present invention was proved to have the higher capacity and initial charge-discharge efficiency and the stable cycle performance based on the evaluation results of the present Example.

TABLE 12

| | Discharging Capacity Ratio (C300/C1) |
|---|---|
| Example 10 | 80.1% |
| Example 11 | 90.3% |
| Example 12 | 91.9% |
| Example 13 | 91.2% |
| Example 14 | 90.2% |
| Example 15 | 90.2% |

The reversible capacities of the cathode and the anode assembled in the batteries of Examples 10 to 15 were measured after conducting 20 times of the charge-discharge cycles. At first, the terminal voltages were adjusted to be 3 V after flowing current of 50 mA by using a charge-discharge testing machine. The batteries were disassembled indoors at a dew point of −40° C. or less so that the cathode and the anode were taken out. After the surfaces thereof were washed with the DEC and dried, the reversible capacities were measured. The electrode for the measurement had an area of ϕ 1.5 cm and lithium metal (ϕ 2 cm and thickness of 1 mm) was used as a counter electrode.

For the measurement of the reversible capacity of the anode, a mixed solvent of ethylene carbonate (EC) and diethyl carbonate (DEC) dissolving 1 mol/liter of $LiPF_6$ (mixed volume ratio: EC/DEC=30/70) was used as electrolyte. Non-woven propylene cloth was used as a separator to fabricate a coin cell battery. Measurement current was 0.1 mA. After current was flown while applying a negative voltage on the anode and a positive voltage on the lithium metal until the terminal voltage reached to 0V, then current was flown while applying a positive voltage on the anode and a negative voltage on the lithium metal until the terminal voltage reached to 2.5V. During the procedure, the Li ion was taken out from the anode to return to the lithium metal in the counter electrode, thereby increasing the terminal voltage. Accordingly, the reversible capacity of the anode was made to be the capacity when a voltage range was from 0 to 2.0 V ($Li/Li^+$) during which the Li ion was taken out from the anode and returned to the lithium metal in the counter electrode.

For the measurement of the reversible capacity of the cathode, a mixed solvent of ethylene carbonate (EC) and diethyl carbonate (DEC) dissolving 1 mol/liter of $LiPF_6$ (mixed volume ratio: EC/DEC=30/70) was used as electrolyte. Non-woven propylene cloth was used as a separator to fabricate a coin cell battery. Measurement current was 0.1 mA. At first, current was flown while applying a positive voltage on the cathode and a negative voltage on the lithium metal until the terminal voltage reached to 4.3V. Then current was flown while applying a negative voltage on the cathode and a positive voltage on the lithium metal until the terminal voltage reached to 3.0V. During the procedure, the Li ion released from the lithium metal returned to the cathode, thereby decreasing the terminal voltage of the battery. Accordingly, the reversible capacity of the cathode was made to be the capacity when a voltage range was from 4.3 to 3 V ($Li/Li^+$) during which the Li ion was released and returned to the cathode.

The ratios of the reversible capacities of the anodes in the batteries with respect to those of the cathodes obtained in the above experiment were 0.91 in Example 10, 1.0 in Example 11, 1.08 in Example 12, 1.22 in Example 13, 1.3 in Example 14 and 1.38 in Example 15. These values were not largely changed from the ratios of the reversible capacities calculated from the electrode capacities before assembling the batteries.

EXAMPLE 16

A square battery was fabricated similarly to Example 2. As shown in FIG. 2, a first anode layer 2a having hard carbon as a main component was formed on a current collector 1a made of a copper-foil having thickness of 10 μm. A second anode layer 3a was made of silicon and formed by using a CVD method. A third anode layer 4a was made of metal lithium and formed by using a vacuum-evaporation method. A mixed solvent of propylene carbonate (PC) and ethyl methyl carbonate (EMC) dissolving 1 mol/liter of $LiPF_6$ (mixed volume ratio: PC/EMC=40/60) was used as electrolyte.

The thickness of the second anode layer 3a was 1 μm, and the thickness of the third anode layer 4a was 3 μm.

The charge-discharge cycle test was conducted on the battery. The voltage range of the charge-discharge cycle tests was from 3 to 4.3 V. Upon the observation, with an electron microscope, of the layered structure of the battery at the fully charged condition after 300 cycles, the boundary between the second anode layer 3a and the third anode layer 4a became obscure, and the doping of the lithium constituting the third anode layer 4a into the second anode layer 3a was confirmed. Based on the mass balance between the both layers, a region was apparently formed in the second anode layer 3a containing the excess lithium with respect to its theoretical composition in the fully charged condition.

Since the above embodiments are described only for examples, the present invention is not limited to the above embodiments and various modifications or alternations can be easily made therefrom by those skilled in the art without departing from the scope of the present invention.

The invention claimed is:

1. An anode for a secondary battery capable of inserting and extracting lithium ions, comprising:
a multi-layered structure including:
a first layer containing carbon as a main component;
a second layer made of a material for passing therethrough a lithium component and for inserting and extracting the lithium component, said material having a substantially uniform composition and an amorphous structure; and
a third layer containing lithium and/or a lithium-containing compound, the second layer being sandwiched between the first layer and the third layer.

2. The anode for the secondary battery as claimed in claim 1 wherein the second layer contains at least one material selected from the group consisting of $B_2O_3$, $P_2O_5$, $Al_2O_3$, $W_hO_{3h-1}$ (h=1, 2, 3, 4), $Mo_iO_{3i-1}$ (i=1, 2, 3, 4), TiO and $TiO_2$.

3. The anode for the secondary battery as claimed in claim 1, wherein the second layer contains at least one element selected from the group consisting of Si, Ge, Sn, In, Ag and Pb.

4. The anode for the secondary battery as claimed in claim 1, wherein the second layer is made of one or more materials selected from the group consisting of oxides of Si, Ge, Sn, In, Ag and Pb.

5. An anode for a secondary battery capable of inserting and extracting lithium ions, comprising:
a multi-layered structure including:
a first layer containing carbon as a main component;
a second layer made of a material for passing therethrough a lithium component and for inserting and extracting the lithium component, said material having a substantially uniform composition; and
a third layer containing lithium and/or a lithium-containing compound, the second layer being sandwiched between the first layer and the third layer, and wherein the third layer has an amorphous structure.

6. The anode for the secondary battery as claimed in claim 1, wherein the third layer contains at least one material selected from the group consisting of metal lithium, lithium alloy and lithium nitride.

7. A secondary battery, comprising:
an anode having a multi-layered structure, wherein said multi-layered structure includes:
a first layer containing carbon as a main component;
a second layer made of a material for passing therethrough a lithium component and for inserting and extracting the lithium component, said material having a substantially uniform composition and an amorphous structure; and
a third layer containing lithium and/or a lithium-containing compound, the second layer being sandwiched between the first layer and the third layer;
a cathode which can insert and extract a lithium ion; and
electrolyte placed between the anode and the cathode.

8. The secondary battery as claimed in claim 7, wherein a ratio of a reversible capacity of the cathode with respect to a reversible capacity of the anode is in a range from 1.0 to 1.3.

9. The secondary battery as claimed in claim 7, wherein the anode contains an excess lithium component with respect to its theoretical composition in a fully charged condition.

10. The secondary battery as claimed in claim 7, wherein a total amount of the lithium component of the first layer and the second layer is larger than a sum of theoretical amounts of the lithium component of the first layer and the second layer in a fully charged condition.

11. The secondary battery as claimed in claim 7, wherein the anode contains the lithium component larger than a sum of theoretical amounts of the lithium component of the first layer and the second layer in a fully charged condition.

12. The secondary battery as claimed in claim 7, wherein the second layer contains at least one material selected from the group consisting of $B_2O_3$, $P_2O_5$, $Al_2O_3$, $W_hO_{3h-1}$ (h=1, 2, 3, 4), $Mo_iO_{3i-1}$ (i=1, 2, 3, 4), TiO and $TiO_2$.

13. The secondary battery as claimed in claim 7, wherein the second layer contains at least one element selected from the group consisting of Si, Ge, Sn, In, Ag and Pb.

14. The secondary battery as claimed in claim 7, wherein the second layer is made of one or more materials selected from the group consisting of oxides of Si, Ge, Sn, In, Ag and Pb.

15. A secondary battery, comprising:
an anode having a multi-layered structure, wherein said multi-layered structure includes:
a first layer containing carbon as a main component;
a second layer made of a material for passing therethrough a lithium component and for inserting and extracting the lithium component, said material having a substantially uniform composition; and
a third layer containing lithium and/or a lithium-containing compound, the second layer being sandwiched between the first layer and the third layer, wherein the third layer has an amorphous structure;
a cathode which can insert and extract a lithium ion; and
electrolyte placed between the anode and the cathode.

16. The anode for the secondary battery as claimed in claim 7, wherein the third layer contains at least one material selected from the group consisting of metal lithium, lithium alloy and lithium nitride.

* * * * *